United States Patent
Wozniak et al.

[11] 3,908,427
[45] Sept. 30, 1975

[54] EXTRUSION TOOL

[75] Inventors: Bernhard Wozniak; Ernst Kaffenberger, both of Backnang, Germany

[73] Assignee: Licentia Patent-Verwaltungs-G.m.b.H., Frankfurt am Main, Germany

[22] Filed: Apr. 24, 1974

[21] Appl. No.: 463,815

[30] Foreign Application Priority Data
Apr. 30, 1973  Germany............................ 2321770
Apr. 30, 1973  Germany............................ 7316299

[52] U.S. Cl. .................... 72/264; 72/273; 72/478
[51] Int. Cl.² ........................................ B21C 23/04
[58] Field of Search ............ 72/264, 273, 478, 370, 72/482

[56] References Cited
UNITED STATES PATENTS
1,819,254  8/1931  Mantle ................................ 72/264
2,872,037  2/1959  Ansel ................................. 72/264
3,411,337  11/1968  Murphy .............................. 72/264

*Primary Examiner*—Richard J. Herbst
*Assistant Examiner*—Robert M. Rogers
*Attorney, Agent, or Firm*—Spencer & Kaye

[57] ABSTRACT

An extrusion tool for making tubular articles has a die holder to which a die is secured and a mandrel formed of a mandrel front supported in the die holder and a mandrel cylinder. A connecting device urges the mandrel front and the mandrel cylinder into contact with one another, while allowing a limited play between them. The die has a die opening which determines the external boundaries of the articles, whereas the mandrel determines their internal boundaries.

10 Claims, 2 Drawing Figures

EXTRUSION TOOL

BACKGROUND OF THE INVENTION

This invention relates to tube extruders, and more particularly is concerned with the positioning of tool components in the extruder head.

In the manufacture of aluminum tubes, external cable conductors and cable sheaths by means of an extrusion process, it has been conventional to support tool components, such as a mandrel and a die, relatively independently from one another in bores that are disposed in facing sides of the extruder head. In such an arrangement it is unavoidable that the position of the longitudinal axis of the mandrel is fixed only in an imprecise manner with respect to the center of the die cavity. In order to compensate for these deviations, in the chuck which carries the die, there are provided centering devices, by means of which the die may be shifted parallel to a plane which is perpendicular to the theoretical mandrel axis. A setting with a device of this type is time consuming and is not permanent, because due to mechanically or thermally caused changes, displacements and deflections of the mandrel during operation cannot be entirely prevented.

SUMMARY OF THE INVENTION

It is an object of the invention to provide a self-centering extrusion tool which is substantially independent from machine tolerances and which is adapted for the manufacture of tubular articles, particularly wave guides for microwaves where a uniformity of cross sectional and longitudinal dimensions is of primary consideration.

It is a further object of the invention to provide an extrusion tool by means of which the adjusting times and the idle periods of the extruder during tool replacement are reduced and which provide for a reproducibility of the product dimensions even in case of repeated exchange of tools.

These objects and others to become apparent as the specification progresses, are accomplished by the invention, according to which, briefly stated, the mandrel is formed of two separate interconnected components: a mandrel cylinder axially slidably supported in a chuck and a mandrel front form-lockingly supported by the die holder. The two mandrel components are urged into contact with one another, but they are allowed a play of limited extent with respect to one another. The die has an opening which determines the external bounderies of the tubular product, while the mandrel front which adjoins the die, has a portion which determines the internal boundaries of the tubular product.

DESCRIPTION OF THE PREFERRED EMBODIMENT

Figure 1:
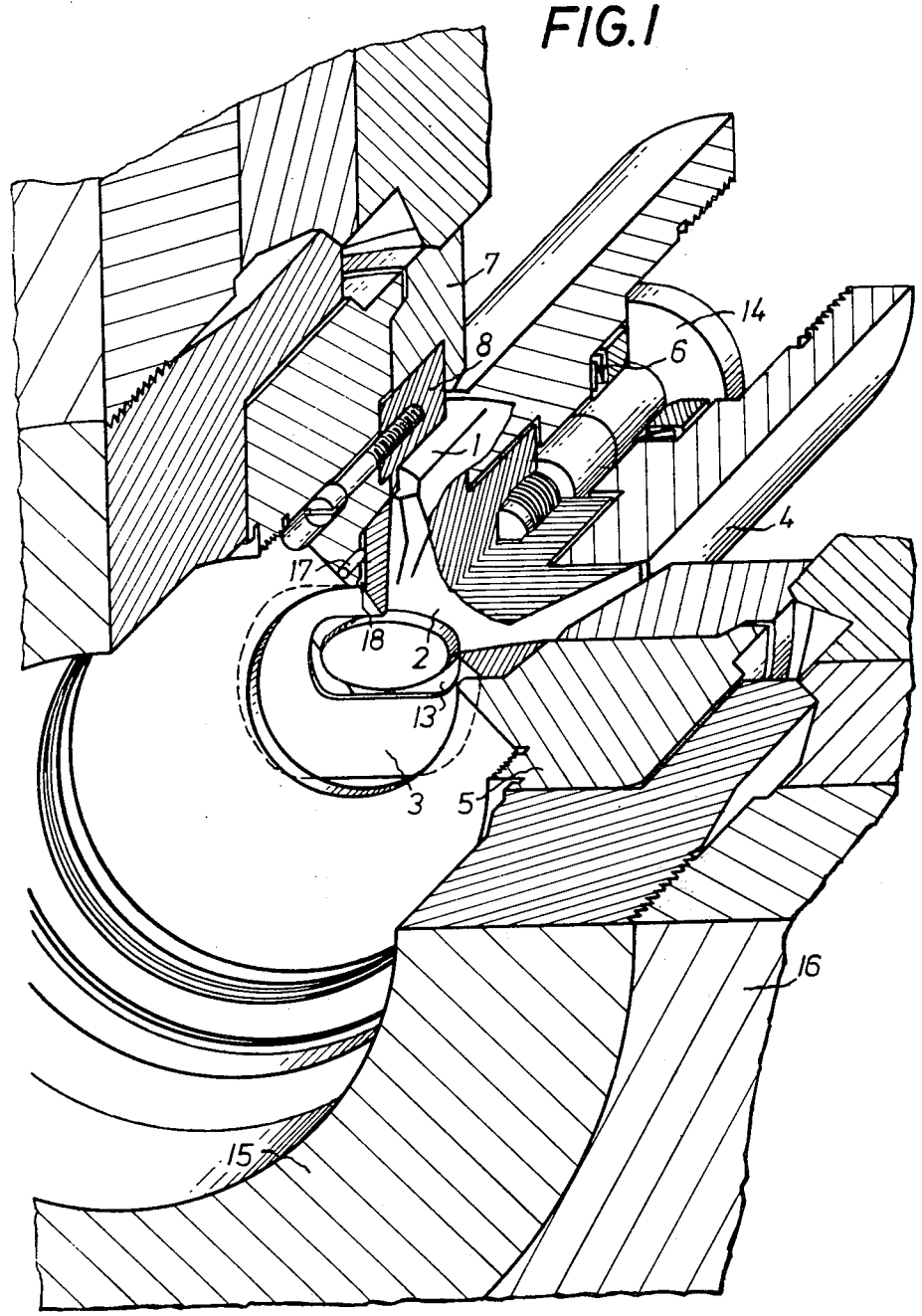
FIG. 1 is a perspective view of a preferred embodiment shown cut away for better illustration of components.

Turning now to FIG. 1, the extrusion tool shown therein is particularly adapted for making waveguides of non-circular cross section. The extrusion tool essentially comprises a die holder 5, 7 which serves for supporting and fixedly positioning a die 3 in the extruder head 16 by means of a chuck 15. The die holder 5, 7 is a two-part component formed of a die-receiving member 5 and a base ring 7 which is secured — for example, by screws (not shown) — to the component 5 and which is supported in the extruder head 16. The die 3 which is disposed in the center of the die-receiving member 5, is provided with a die opening 13 which determines the external dimensions of the hollow tubular product, such as a waveguide. The orientation of the cross-sectional axes of the die opening 13 with respect to the die holder 5, 7 is determined in a conventional manner by means of a pin 17 which is secured to the die holder component 5 and which cooperates with a recess 18 provided in the die 3.

Figure 2:
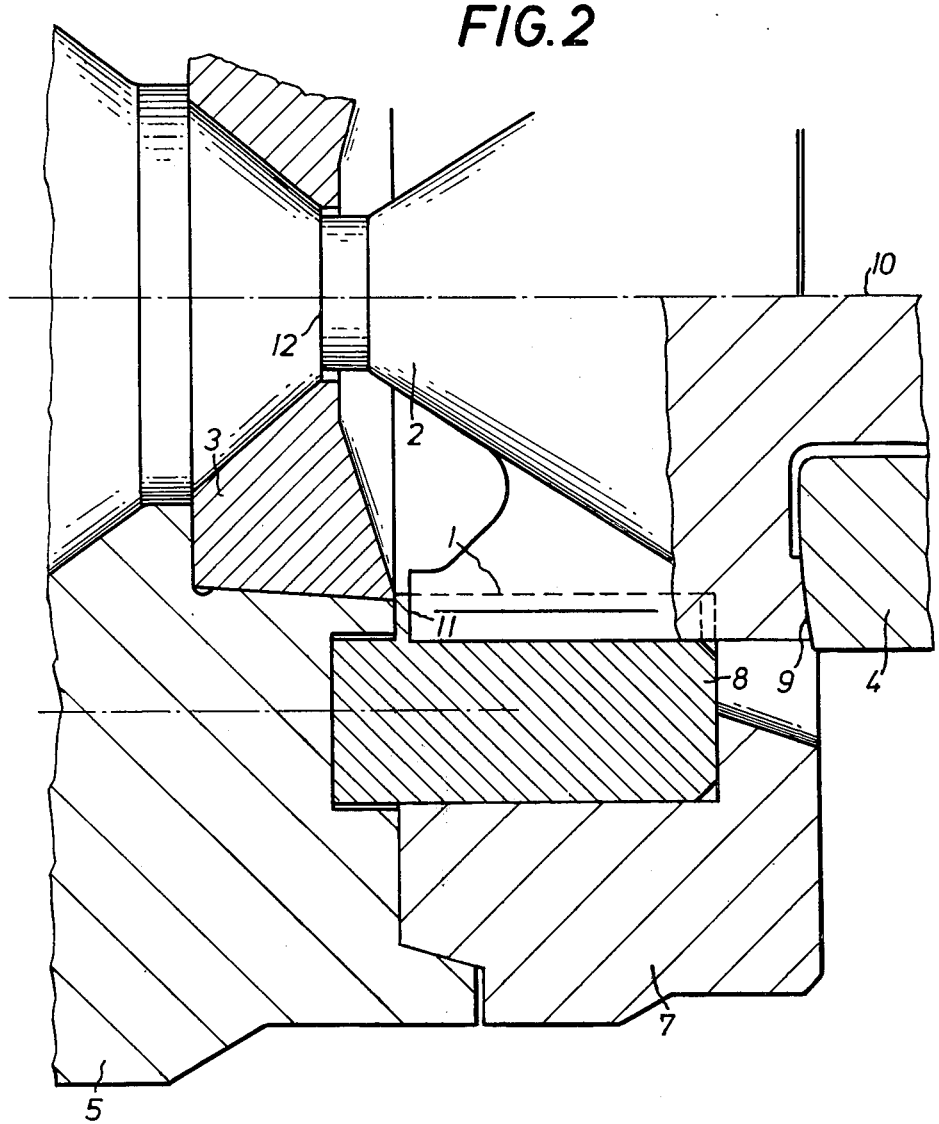
FIG. 2 is a longitudinal sectional view through some of the components shown in FIG. 1.

In a support at the axially opposite side (not shown) of the extruder head 16 there is axially displaceably supported a cylinder portion 4 of the extruder mandrel (hereinafter referred to as "mandrel cylinder 4"). Adjoining that end of the mandrel cylinder 4 which is adjacent the die 3, there is disposed a frontal portion 2 of the mandrel (hereinafter referred to as "mandrel front 2") which is movably connected with the mandrel cylinder 4 in a force-transmitting manner in a way to be described in more detail later. The position of the longitudinal axis of the mandrel front 2 with respect to the die 3 is immobilized and is thus automatically centered permanently with respect to the die 3 by means of guide wings 1 and cooperating guide blocks 8. The guide wings 1 are integral with the mandrel front 2, while the guide blocks 8 are secured to the die receiving member 5 by screws and are accommodated in conforming recesses in the base ring 7. The cooperation (sliding contact) between associated guide wings and guide blocks results (for example, by virtue of appropriately flattened contacting faces) in a form-locking positioning of the mandrel front 2 which means that the mandrel front 2 is substantially prevented from shifting radially or from turning about its longitudinal axis 10. Thus, the axis 10 cannot shift laterally and further, the orientation of the cross-sectional axes of forward portion 12 of the mandrel front 2 is also fixed. The wings 1 and the blocks 8 thus connect the mandrel front 2 to the die holder member 5 in a plane that is perpendicular to the mandrel axis 10. As it may be observed particularly in FIG. 2, the forward portion 12 of the mandrel front 2 is immediately adjacent the die 3 and determines the internal boundaries of the tubular product, such as a waveguide. Thus, the forward portion 12 of the mandrel front 2 defines, with the die opening 13, an annular clearance which determines the wall thickness as well as the inner and outer dimensions of the article to be manufactured.

In preparation of the extruding operation, first the precedingly heated plasticized aluminum mass is, at a certain angle (substantially 90°) to the longitudinal axis 10 of the mandrel forced under high pressure into the hollow space of the extruder head 16. Thereafter, the material is deflected to be aligned with the mandrel axis 10 and is driven therealong to form a mantle around the mandrel cylinder 4 and the mandrel front 2 and is subsequently passed through the annular clearance between the forward portion 12 and the die opening 13. Subsequently, the seamless tubular product emerging from the annular clearance is submitted to a cooling treatment.

During operation of the extruder, forces are generated which, dependent upon the operational state of the extruder, seek to displace the mandrel generally in the flow direction of the plasticized mass which is forced into the extruder head in a direction that is generally normal to the longitudinal axis 10 of the mandrel.

By virtue of the invention, according to which the mandrel is divided into the mandrel cylinder 4 and the mandrel front 2, the above-noted forces that are generated during operation can be isolated from the guide surfaces of the guide wings 1 and the guide blocks 8 in such a manner that these guide surfaces are capable to support the mandrel front 2 with respect to the die 3 in a predetermined position in a reliable manner. Since, particularly in the manufacture of tubular products of noncircular cross section, there is required an exact registry of the cross-sectional axes of the die opening and the forward portion 12 of the mandrel front 2, the positioning of the mandrel front 2 by the cooperation between the wings 1 and the associated blocks 8 has been found very advantageous.

In order to reduce the penetration of the plasticized mass between the mandrel front 2 and the mandrel cylinder 4 to a minimum value, the contact face between the mandrel front 2 and the mandrel cylinder 4 has a spherical configuration 9, the center of which lies on the longitudinal mandrel axis 10. Between the mandrel front 2 and the mandrel cylinder 4 a friction force is required to bring the mandrel front 2 during its installation in the apparatus, into the correct position by the mandrel cylinder 4 in the extruder head 16. For generating such a friction force, the mandrel front 2 is pressed into contact with the mandrel cylinder 4 by means of a biased and preferably temperature-independent spring 6 and a bolt 14 threadedly received in the mandrel front 2. These frictional forces, however, are not as large as to transmit to an impermissible extent those already described deflection forces to the mandrel front 2 which displace the longitudinal axis of the mandrel cylinder 4. Thus, the connection between the mandrel front 2 and the mandrel cylinder 4 is so designed that the mandrel cylinder 4 is allowed a radial and axial play with respect to the mandrel front 2.

In order to avoid difficulties when the mandrel 2, 4 is removed from the extruder, the play of the mandrel front 2 with respect to the mandrel cylinder 4 is limited and further, the largest cross-sectional dimension of the mandrel front 2 is so designed that even in case of a maximum radial deflection of the mandrel front 2, its parts of largest radial dimensions still cannot radially project beyond the maximum cross section of the mandrel cylinder 4. Expediently, the difference between the maximum diameter of the mandrel cylinder 4 and the maximum diameter of the mandrel front 2 equals the maximum possible radial deflection (play) of the mandrel cylinder 4 with respect to the mandrel front 2.

The shape and the dimensions of the guide wings 1 in the inlet portion at the mandrel front 2 are so selected that, dependent from the cross section of the tubular product to be manufactured, there is achieved a flawless combination and unification of the flowing mass even upstream of the plane of the die opening 13. In order to prevent that the axially displaceable mandrel 2, 4 is shifted too far in the direction of the die 3, at the guide blocks 8 abutment faces 11 are provided which limit the axial travelling path of the guide wing 1 in the direction of the die 3.

A tool designed according to the invention thus makes possible a reproducible optimal positioning of the mandrel front 2 and the die 3. Further, this positioning is substantially independent from the mechanical and temperature-caused influences even during extrusion.

It is further to be observed that in the exemplary embodiment described, the mandrel has no throughgoing axial bore since such is generally not needed in the manufacture of tubular articles. It is feasible, however, to conventionally provide mandrels, which are used for the manufacture of outer cable conductors or cable sheaths, with a throughgoing bore for the feeding of the conductors into the extruded tube or for accommodating cooling devices.

It will be understood that the above description of the present invention is susceptible to various modifications, changes and adaptations, and the same are intended to be comprehended within the meaning and range of equivalents of the appended claims.

We claim:
1. An extrusion tool for extruding tubular products, comprising in combination:
   a. a die holder;
   b. a die supported by said die holder, said die including means defining a die opening through which the tubular product is extruded and which determines the external boundaries of the tubular product;
   c. a mandrel determining the internal boundaries of the tubular product, said mandrel being formed of a mandrel cylinder and a mandrel front, said mandrel cylinder and said mandrel front having coinciding longitudinal axes constituting the axis of said mandrel;
   d. first connecting means for coupling said mandrel cylinder and said mandrel front to one another, said first connecting means including means for urging said mandrel cylinder and said mandrel front into contact with one another and for providing a limited play of said mandrel cylinder with respect to said mandrel front; and
   e. second connecting means for coupling said mandrel front to said die holder form-lockingly in a plane normal to the mandrel axis, said second connecting means including form-locking means for preventing said mandrel front from executing radial shifts and rotation about said axis.

2. An extrusion tool as defined in claim 1, wherein the maximum diameter of said mandrel front is smaller than the maximum diameter of said mandrel cylinder.

3. An extrusion tool as defined in claim 1, wherein the maximum diameter of said mandrel front is smaller than the maximum diameter of said mandrel cylinder by a length identical to the maximum length of a radial play of said mandrel cylinder with respect to said mandrel front.

4. An extrusion tool as defined in claim 1, wherein said die holder is formed of a die receiving member and a base ring secured thereto, said die receiving member and said base ring being in axial alignment with the mandrel axis.

5. An extrusion tool as defined in claim 1, wherein said mandrel front and said mandrel cylinder have contact faces oriented to one another, said first connecting means includes a temperature-independent biased spring contacting said mandrel cylinder for urging said contact faces into engagement with one another.

6. An extrusion tool as defined in claim 5, wherein said contact faces are of conforming spherical shape having a center lying on the mandrel axis.

7. An extrusion tool as defined in claim 1, wherein said form-locking means of said second connecting means includes at least two guide wings affixed to said mandrel front and guide blocks secured to said die holder, said guide wings being supported by side guide blocks.

8. An extrusion tool as defined in claim 7, wherein said die holder is formed of a die receiving member and a base ring secured thereto, said base ring including means defining recesses each accommodating and supporting substantially without play a separate one of said guide blocks.

9. An extrusion tool as defined in claim 8, further including means for affixing said guide blocks to said die receiving member in a force-transmitting manner; each said recess having a shape to form-lockingly accommodate the associated guide block.

10. An extrusion tool as defined in claim 9, wherein said means for affixing said guide blocks to said die receiving member include tightening screws.

* * * * *